C. F. LA MANTIA.
BICYCLE SKIRT SHIELD.
APPLICATION FILED AUG. 14, 1920.

1,373,338.

Patented Mar. 29, 1921.
3 SHEETS—SHEET 1.

C. F. LaMantia,
INVENTOR

BY Victor J. Evans
ATTORNEY

WITNESS:
W. Johnson

C. F. LA MANTIA.
BICYCLE SKIRT SHIELD.
APPLICATION FILED AUG. 14, 1920.

1,373,338.

Patented Mar. 29, 1921.

C. F. LaMantia,
INVENTOR

BY Victor J. Evans
ATTORNEY

WITNESS:

C. F. LA MANTIA.
BICYCLE SKIRT SHIELD.
APPLICATION FILED AUG. 14, 1920.

1,373,338.

Patented Mar. 29, 1921.
3 SHEETS—SHEET 3.

C. F. La Mantia,
INVENTOR

BY Victor J. Evans
ATTORNEY

WITNESS:

UNITED STATES PATENT OFFICE.

CHARLES FRANCIS LA MANTIA, OF NEW YORK, N. Y.

BICYCLE SKIRT-SHIELD.

1,373,338. Specification of Letters Patent. Patented Mar. 29, 1921.

Application filed August 14, 1920. Serial No. 403,538.

*To all whom it may concern:*

Be it known that I, CHARLES F. LA MANTIA, a citizen of United States, residing at New York, in the county of New York and State of New York, have invented new and useful Improvements in Bicycle Skirt-Shields, of which the following is a specification.

This invention relates to bicycles and has for its object the provision of a bicycle which has its frame so constructed that it is adapted for use either as a girl's or a boy's bicycle, a specific feature being that the top frame bar is detachably and hingedly mounted so that it may be swung into either selected one of two positions, depending upon which sex is to use the device.

An important object is the provision of a bicycle in which the mud guard over the rear wheel carries a skirt guard which is collapsible and which is intended to be retained in collapsed position when the bicycle is used by a man or boy but which can be extended to serve as a protection to prevent a woman's skirt from catching in the rear wheel.

An additional object is the provision of a bicycle of this character which will not only have the advantage of being convertible, as above mentioned, but which will also be comparatively simple and inexpensive in manufacture, highly efficient in use, and a general improvement in the art.

With the above and other objects and advantages in view, the invention consists in the details of construction to be hereinafter more fully described and claimed and illustrated in the accompanying drawings in which—

Figure 1:
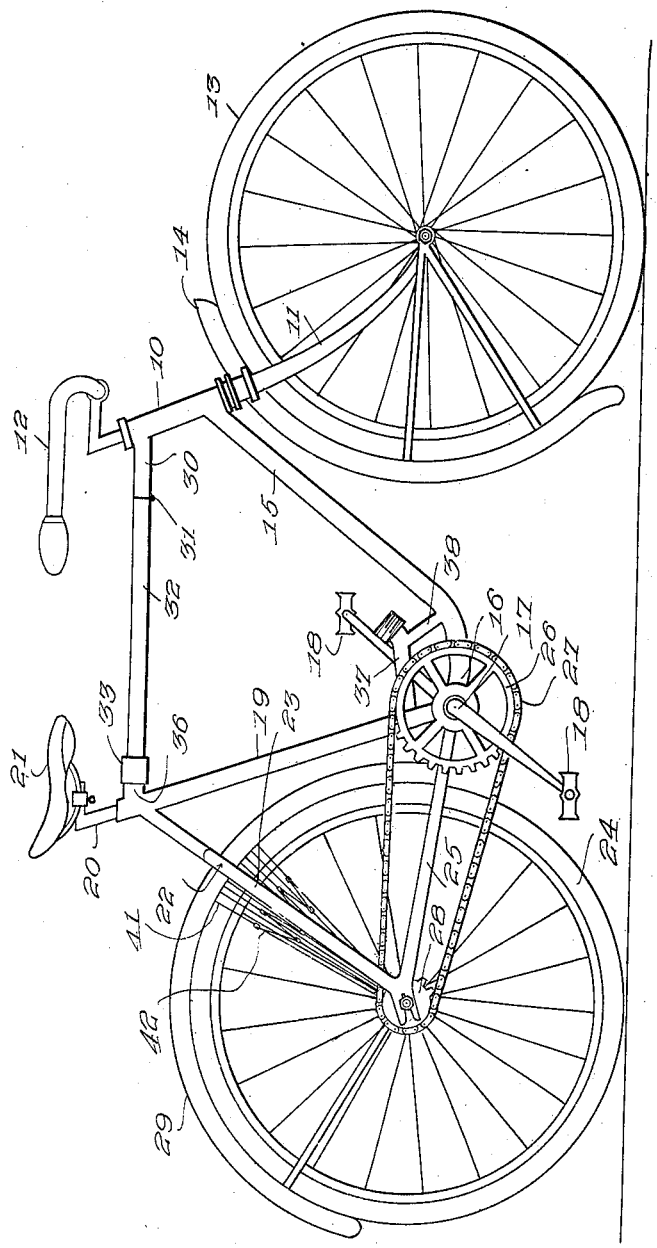
Figure 1 is a side elevation of the bicycle, showing it in its form for use by men or boys.
Figure 2:
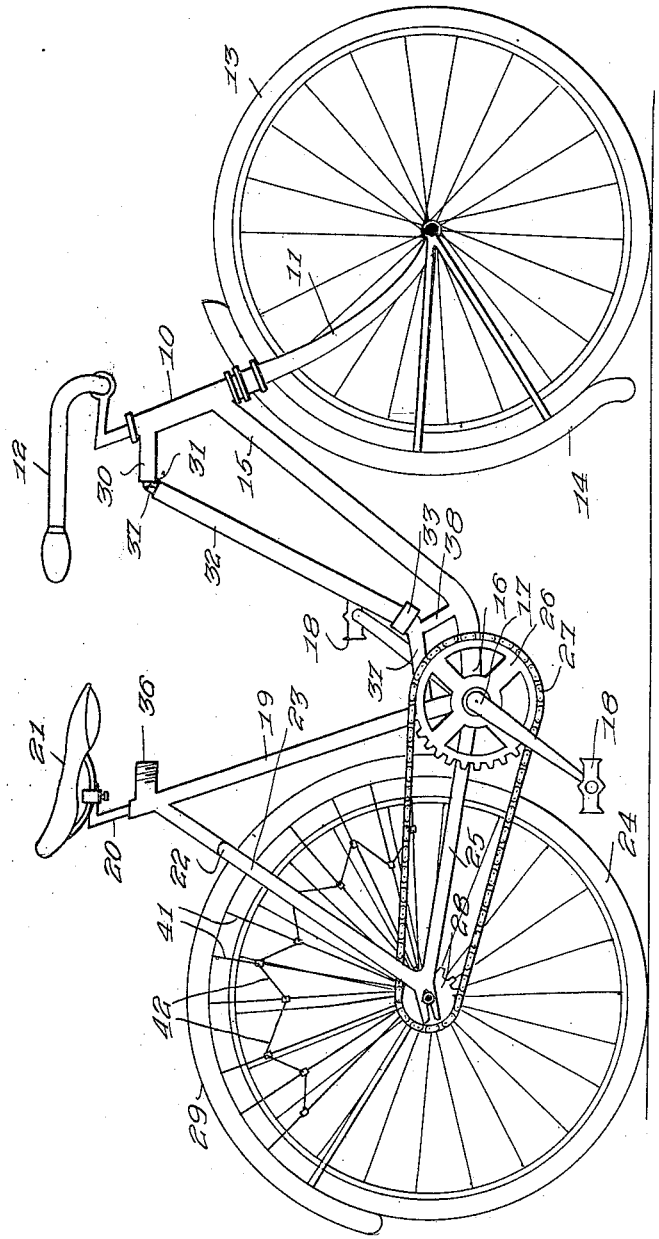
Fig. 2 is a similar view showing the bicycle in the form, for use by women or girls.
Figure 3:
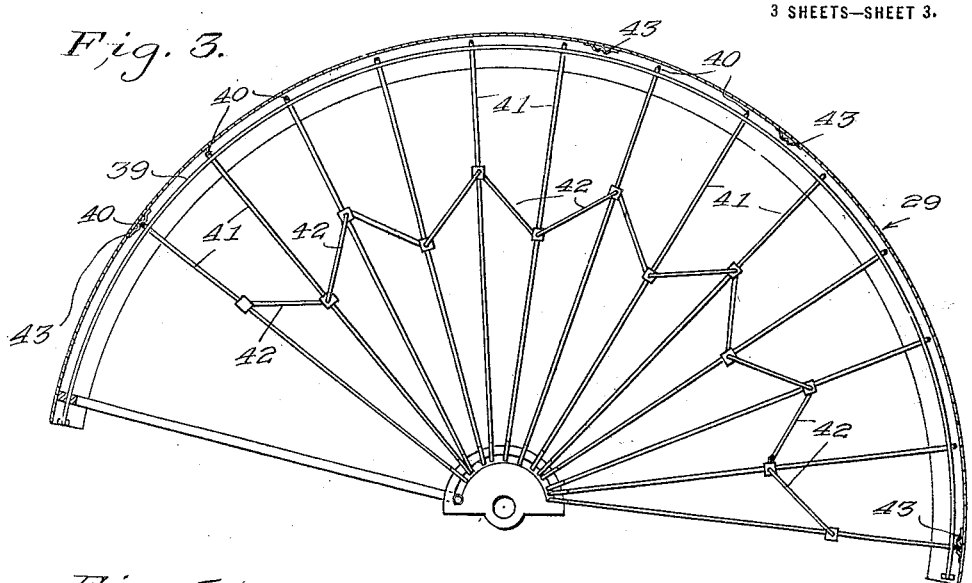
Fig. 3 is a detail longitudinal sectional view through the rear mud guard and associated parts, and showing the dress guard more clearly.
Figure 5:
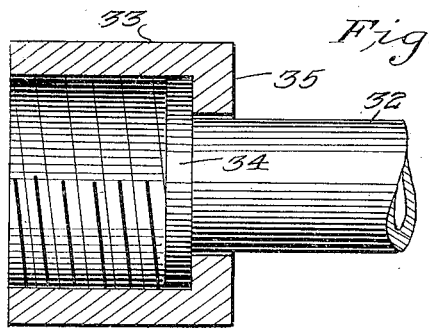
Figs. 5 and 6 are detail views.
Figure 4:
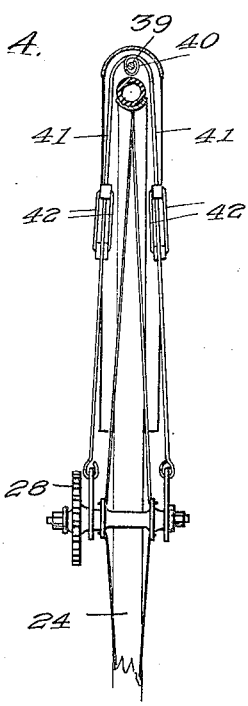
Fig. 4 is a cross sectional view through the rear wheel, mud guard, and associated parts.
Figure 6:
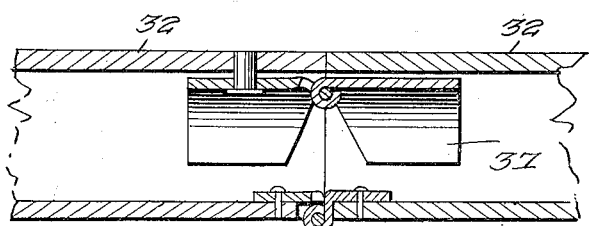

Referring more particularly to the drawings, I have shown a bicycle as comprising a frame including the usual head 10 with which is associated a front fork 11 with which is connected the usual handle bars 12. Journaled within the front fork is the front wheel 13, and the fork may, if preferred, carry a mud guard 14.

The frame further includes the usual inclined bar 15 which leads from the head 10 to the bearing portion 16 for the crank shaft 17 carrying the usual pedals 18. Extending from the bearing portion 16 is an upwardly and rearwardly inclined bar 19 which carries the seat post 20 upon which the saddle 21 is mounted. The numeral 22 designates the rear fork braced by the usual stay 23 and within which is mounted the rear wheel 24 in the usual manner. A brace rod 25 is of course provided which extends from the rear fork to the bearing portion 16.

The bicycle might be of the chainless type though I have illustrated a sprocket 26 carried by the crank shaft 17 and having trained thereabout the usual chain 27 which drives a sprocket 28 on the rear wheel. The numeral 29 designates the usual mud guard which is provided for the rear wheel.

Ordinarily bicycles intended for use by men or boys have the frames provided with a cross bar at the top portion of the head, this bar being however, omitted in bicycles intended for use by women or girls. In carrying out my invention I provide a short bar 30 which extends from the upper portion of the head 10 and with which is hingedly connected, as shown at 31, a bar 32 upon the other end of which is rotatably mounted a nut member 33 which is prevented from slipping off by a flange 34 on the bar engaging a flange 35 on the nut member. Extending forwardly from the upper end of the seat post supporting bar 19 is a stub 36 which is threaded and upon which the nut member 33 may be screwed for converting the frame into the type used by men. At the joint 31 I preferably provide a shield structure 37 which presents a finished appearance even when the joint 31 is opened by swinging the bar 32 downwardly.

Located at or near the juncture of the bar 19 with the bearing member 16 is a short forwardly extending bar 37 reinforced by a brace 38. The bar 37 is threaded and the nut member is adapted to be screwed thereon when it is desired to convert the bicycle into the type used by women or girls. It will be observed that the bar 32 may be very quickly and easily moved from one position to the other, depending upon the use.

Associated with the rear mud guard 29 is a dress guard structure which includes a curved rod 39 located within the mud guard. Slidable upon this rod 39 are loops 40 formed on the ends of the poke-like members 41 which are connected by inclined brace wires 42 and which are pivotally connected in such a way that the device may be collapsed to lie along the inside of the rear fork 22. At spaced points along the rod 39 are provided catches 43 within which the loops 40 of the spoke members 41 may snap for holding the skirt guard structure in extended position. It is obvious that when the bicycle is to be used by women or girls this skirt guard structure should be in extended position, whereas when use of the device by men is intended this guard structure should be collapsed to lie within the rear fork, as will be clearly understood.

From the foregoing description and a study of the drawings it will be apparent that I have thus provided a simply constructed and easily manipulated bicycle structure which is readily convertible from one type to another so that it may be used by either sex and which will therefore combine in one machine the individual features of two separate types.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In a bicycle including a frame, front and rear wheels, and a mud guard extending over the rear wheel; a skirt guard structure comprising a plurality of spoke-like members slidably associated with said mud guard, members connecting said spoke members, and means for holding said skirt guard structure in extending position.

2. In a bicycle including a frame, front and rear wheels, and a mud guard extending over the rear wheel; a skirt guard structure comprising a plurality of spoke-like members slidably associated with said mud guard, members connecting said spoke members, and means for holding said skirt guard structure in extended position comprising a pair of catches carried by the mud guard, and loops carried by the endmost spoke members and engageable within said catches.

3. In a bicycle including a frame, front and rear wheels, and a mud guard extending over the rear wheel; a skirt guard structure comprising a plurality of spoke like members pivotally and slidably mounted adjacent the hub of the rear wheel and slidably associated with said mud guard, a plurality of member pivoted upon and connecting said spoke like members, and means for holding said spoke like members in extending position comprising a pair of catches carried by the mud guard, and members carried by the endmost spoke members and engageable with the said catches.

4. In a bicycle including a frame, front and rear wheels and a mud guard extending over the rear wheel; a skirt guard structure comprising a plurality of spoke like members slidably associated with said mud guard, a pair of plates secured at opposite sides of the hub of the rear wheel and formed with arcuate slots within which the inner ends of said spoke like members are slidably and pivotally engaged, a plurality of members connecting said spoke like members, a pair of catches carried by the mud guard, and loops carried by the endmost members and engageable within said catches whereby to hold said guard structure in extending position.

In testimony whereof I affix my signature.

CHARLES FRANCIS LA MANTIA.

Witness:
BENIDETTO LA MANTIA.